A. HUSKAMP.
Cap-Box.
No. 162,387. Patented April 20, 1875.
FIG I
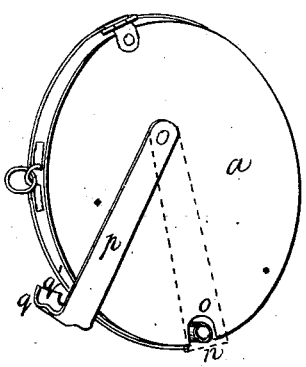
FIG II
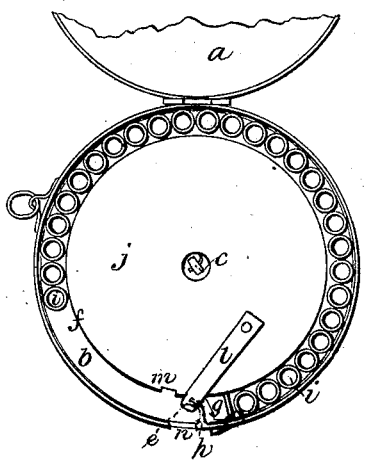
FIG III
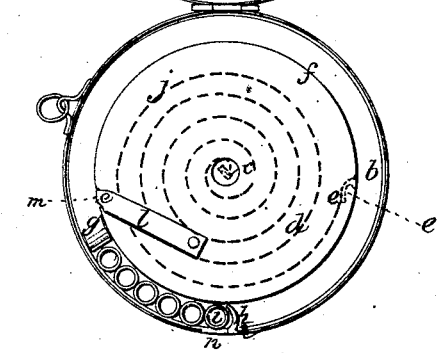
FIG IV
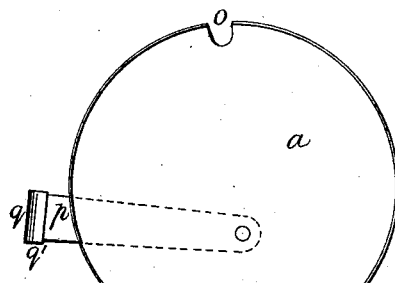
FIG V
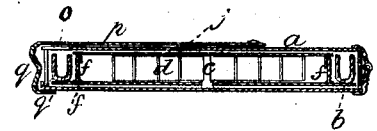
FIG VI
WITNESSES
John E. Laing
H. Rutherford
INVENTOR
Anton Huskamp
by Johnson and Johnson
his Attorneys
THE GRAPHIC CO. PHOTO-LITH. 39 & 41 PARK PLACE, N.Y.

UNITED STATES PATENT OFFICE.

ANTON HUSKAMP, OF MONTAGUE, MICHIGAN.

IMPROVEMENT IN CAP-BOXES.

Specification forming part of Letters Patent No. 162,387, dated April 20, 1875; application filed November 28, 1874.

*To all whom it may concern:*

Be it known that I, ANTON HUSKAMP, of Montague, in the county of Muskegon and State of Michigan, have invented certain new and useful Improvements in Field Cap-Box and Primer; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This invention relates to a field cap-box and primer for sportsmen's use; and the particular improvements which I have made in such primer consists in an eccentrically-pivoted slide-covering and hasp-piece, carried by the hinged cover of the cap-box and primer, in combination with the priming-exits of the box and cover, and the hinged cover, for the purposes of opening and locking the box and guarding the exits from the weather; and in the combination of the dog upon the carrier-lid with the seat for the caps on the inner periphery of the box, for the purpose of preventing the cap-carrier from moving while the caps are being placed in the annular way.

In the accompanying drawings, Figure 1 represents a view in perspective of a field cap-box and primer embracing my invention; Fig. 2, a view of the interior, showing the annular cap-way and the manner of holding the cap carrier or platform when the box is being filled with caps; Fig. 3, a similar view, showing the position of the dog when not in use; Fig. 4, a diametrical section of the box through the priming-exits; Fig. 5, a view of the covering-lid for the spring, showing its interlocking notch; and Fig. 6, a section of the cap-carrying platform.

The primer consists of a shallow round box, which contains the operating-spring and the way for the caps, and is provided with a hinged cover, $a$, which is thus fastened, in order not only to obtain a proper locking, but to avoid the jar of the contents incidental to box-lid covers. Within the box and of slightly less diameter, just sufficient to permit of free movement, is a circular cap-carrier, $b$, which is turned upon a central stem, $c$, by means of a spring, $d$, coiled upon a disk integral with said carrier or platform $b$, said spring having one of its ends fastened to the stem $c$, and the other held by a catch, $e$, on the inner wall of the curb $f$, which rises from said platform cap-carrier. This curb $f$ serves not only to inclose the operating-spring, but, in combination with the inner periphery of the box and the platform, forms an annular way for the caps. The width of this annular way is only slightly in excess of the diameter of the caps, for the purpose of permitting the carrier $b$ to travel freely, yet at the same time sufficiently narrow to prevent the caps from toppling, and to keep them in proper position for priming. Upon the outer wall of this curb $f$, and extending nearly across the cap-way, is a driver, $g$, against which the cap farthest from the exit abuts, while the cap at the exit abuts against a seat-stop, $h$, projecting from the inner periphery of the box at the priming-exit nearly across the annular way. This seat-stop $h$ is in the form of a broad-faced hook, to accommodate itself to a portion of the side of the cap $i$, and thus all liability of the cap to drop out is avoided. The driver $g$ and seat $h$ combine to keep the caps in a compact line between them in the annular way. The spring $d$ is prevented from flying out and preserved from the moisture of the air by a lid, $j$, the rim of which fits within the curb $f$, and is notched at $k$, so as to be locked within the catch $e$, and be prevented from turning when the dog $l$ is hooked with the seat-stop $h$ in the operation of filling the box with caps. This dog $l$ is pivoted eccentrically on the top of this circular lid $j$, and when not in use fits into a recess, $m$, in said lid. At the seat-stop $h$ there is an opening, $n$, in the periphery of the box, from which the cap $i$ is drawn out laterally when placed upon the nipple of the gun, this placing of the cap upon the gun tube or nipple being effected through an adjacent opening, $o$, in the cover $a$ of the box.

The method of filling the box and of priming is as follows: The box being empty and the spring at rest, the carrier is turned from left to right until the dog $l$ is caused to seize upon the seat-stop $h$, and the caps are then placed in the annular way, between the driver $g$ and seat $h$, in numbers sufficient to fill it.

The dog $l$ is then disengaged and set into its recess $m$ in the lid, as its function is now performed by the cap $i$, which rests in said seat $h$. The cover being closed, the box is held so that the opening $o$ shall be over the nipple of the gun, and being pressed down, the cap $i$ is received by the nipple, and by pulling the box slightly in the plane of the gun the cap is released from its confinement through the opening $n$, and the succeeding cap takes its place, and so on to the last cap, the spring $d$ at all times exerting its force by means of the driver $g$, to preserve a compact line of caps in said way, and constantly keeping one cap at the exit for priming. The hinged cover $a$ is provided with a metallic strap-piece, $p$, which is pivoted eccentrically upon said cover, and is provided with a lapping end, $q$, so as to cover both the openings $o$ and $n$, and thus preserve the caps from all unnecessary exposure, and at the same time act as a hasp for fastening the cover. This piece $p$ is pivoted eccentrically for the purpose of releasing its under lap $q'$, when it is required to raise the cover for the purpose of replenishing the caps.

I claim—

1. The eccentrically-pivoted hasp slide-piece $p\ q$, carried by the hinged cover $a$, in combination with the priming-exits $n\ o$ and said cover, as and for the purpose described.

2. The combination of the dog $l$ of the carrier-lid $j$ with seat-stop $h$ of the inner periphery of the box, for the purpose of holding the cap-carrier while the caps are being placed in the box, as described.

In testimony that I claim the foregoing I have affixed my signature in presence of two witnesses.

ANTON HUSKAMP.

Witnesses:
   ALONZO E. KINGSLEY,
   WILLIAM C. ARNOLD.